US011338622B2

(12) United States Patent  
Shimizu

(10) Patent No.: US 11,338,622 B2  
(45) Date of Patent: May 24, 2022

(54) RUN-FLAT TIRE

(71) Applicant: The Yokohama Rubber Co., LTD., Tokyo (JP)

(72) Inventor: Tsuyoto Shimizu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/292,943

(22) PCT Filed: Nov. 14, 2019

(86) PCT No.: PCT/JP2019/044781  
§ 371 (c)(1),  
(2) Date: May 11, 2021

(87) PCT Pub. No.: WO2020/101003  
PCT Pub. Date: May 22, 2020

(65) Prior Publication Data  
US 2022/0032693 A1  Feb. 3, 2022

(30) Foreign Application Priority Data  
Nov. 16, 2018  (JP) .............................. JP2018-215424

(51) Int. Cl.  
*B60C 17/00* (2006.01)  
*B60C 15/06* (2006.01)  
*B60C 15/00* (2006.01)

(52) U.S. Cl.  
CPC ...... *B60C 15/0036* (2013.01); *B60C 15/0054* (2013.01); *B60C 15/0607* (2013.01);  
(Continued)

(58) Field of Classification Search  
CPC ............ B60C 17/0009; B60C 17/0018; B60C 17/0027; B60C 17/0036; B60C 17/0045;  
(Continued)

(56) References Cited

U.S. PATENT DOCUMENTS

2013/0037193 A1* 2/2013 Horiuchi ............. B60C 17/0009  
152/517  
2014/0034205 A1* 2/2014 Yukawa ............... B60C 17/0009  
152/510  
(Continued)

FOREIGN PATENT DOCUMENTS

JP  2010-137852 A  6/2010  
JP  2010-137853 A  6/2010  
(Continued)

*Primary Examiner* — Kendra Ly  
(74) *Attorney, Agent, or Firm* — Thorpe North & Western

(57) ABSTRACT

A run-flat tire includes a side reinforcing rubber layer, a first bead filler on an inner side of a carcass turned-up portion in a width direction, and a second bead filler on an outer side of the carcass turned-up portion in the width direction. A first bead filler height is 30% or less of a tire cross-sectional height SH. A second bead filler height is 50% or greater of the height SH. A cross-sectional area of the second bead filler is from 150% to 400% of a cross-sectional area of the first bead filler. A relationship $(0.16 \times SH \times LI - 1100) \leq S_{ALL} \leq (0.16 \times SH \times LI - 800)$ is satisfied, where $S_{ALL}$ represents a sum of cross-sectional areas of the side reinforcing rubber layer and the first and second bead fillers, and LI represents a load index.

18 Claims, 10 Drawing Sheets

(52) U.S. Cl.
CPC .... *B60C 17/0009* (2013.01); *B60C 2015/061* (2013.01); *B60C 2015/0621* (2013.01); *B60C 2017/0054* (2013.01); *B60C 2017/0063* (2013.01)

(58) Field of Classification Search
CPC .... B60C 2017/0054; B60C 2017/0063; B60C 2017/0072; B60C 15/0603; B60C 15/0607; B60C 2015/061; B60C 2015/0617; B60C 2015/0621; B60C 2015/0625
See application file for complete search history.

(56) References Cited

U.S. PATENT DOCUMENTS

2020/0016942 A1\* 1/2020 Kameda .............. B60C 15/0607
2021/0339582 A1\* 11/2021 Takemori ............ B60C 15/0036

FOREIGN PATENT DOCUMENTS

| | | |
|---|---|---|
| JP | 2012-96656 A | 5/2012 |
| JP | 5282794 B2 | 9/2013 |
| JP | 2014-54967 A | 3/2014 |
| JP | 2015-67256 A | 4/2015 |
| JP | 2015-98198 A | 5/2015 |
| JP | 2015-205594 A | 11/2015 |
| JP | 5835171 B2 | 12/2015 |
| JP | 2016-132343 A | 7/2016 |
| JP | 2017-056815 A | 3/2017 |
| JP | 2017-121888 A | 7/2017 |
| JP | 6249518 B2 | 12/2017 |
| JP | 6319415 B1 | 5/2018 |
| WO | 2014/141880 A1 | 9/2014 |
| WO | 2018/116646 A1 | 6/2018 |

\* cited by examiner

|  | Conventional Example | Comparative Example 1 | Comparative Example 2 | Comparative Example 3 | Comparative Example 4 |
|---|---|---|---|---|---|
| $H_{BFL}/SH$ | 35% | 31% | 25% | 25% | 25% |
| $H_{2FL}/SH$ | 45% | 55% | 49% | 55% | 55% |
| $H_{2FL}/H_{BFL}$ | 129% | 177% | 196% | 220% | 220% |
| $S_{2FL}/S_{BFL}$ | 140% | 160% | 160% | 145% | 405% |
| $S_{ALL}(=S_{2FL}+S_{BFL}+S_{RFL})$ | 1020 | 1080 | 960 | 1020 | 1020 |
| $L_{RFL}$ | 23.5 mm | 13.2 mm | 10.7 mm | 10.7 mm | 10.7 mm |
| $L_{RFL}/H_{BFL}$ | 55% | 35% | 35% | 35% | 35% |
| $L_{2FL}$ | 32.0 mm | 18.9 mm | 15.3 mm | 15.3 mm | 15.3 mm |
| $L_{2FL}/H_{BFL}$ | 75% | 50% | 50% | 50% | 50% |
| $M_{2FL}$ (MPa) | 6.0 | 6.0 | 6.0 | 6.0 | 6.0 |
| $M_{BFL}$ (MPa) | 10.0 | 10.0 | 10.0 | 10.0 | 10.0 |
| $M_{RFL}$ (MPa) | 9.5 | 9.5 | 9.5 | 9.5 | 9.5 |
| $2.0 \times M_{2FL} > M_{BFL}$ | Satisfy | Satisfy | Satisfy | Satisfy | Satisfy |
| $M_{BFL} > M_{RFL}$ | Satisfy | Satisfy | Satisfy | Satisfy | Satisfy |
| $M_{RFL} > 1.5 \times M_{2FL}$ | Satisfy | Satisfy | Satisfy | Satisfy | Satisfy |
| Ride comfort hardness | 100 | 99 | 110 | 98 | 98 |
| Run-flat durability | 100 | 105 | 99 | 105 | 100 |

FIG. 3A

| | Comparative Example 5 | Comparative Example 6 | Example 1 | Example 2 | Example 3 | Example 4 |
|---|---|---|---|---|---|---|
| $H_{BFL}/SH$ | 25% | 25% | 25% | 22% | 23% | 30% |
| $H_{2FL}/SH$ | 55% | 55% | 55% | 55% | 55% | 55% |
| $H_{2FL}/H_{BFL}$ | 220% | 220% | 220% | 250% | 239% | 183% |
| $S_{2FL}/S_{BFL}$ | 160% | 160% | 160% | 160% | 160% | 160% |
| $S_{ALL}(=S_{2FL}+S_{BFL}+S_{RFL})$ | 850 | 1200 | 1020 | 990 | 1000 | 1070 |
| $L_{RFL}$ | 10.7 mm | 10.7 mm | 10.7 mm | 9.4 mm | 9.8 mm | 12.8 mm |
| $L_{RFL}/H_{BFL}$ | 35% | 35% | 35% | 35% | 35% | 35% |
| $L_{2FL}$ | 15.3 mm | 15.3 mm | 15.3 mm | 13.4 mm | 14.0 mm | 18.3 mm |
| $L_{2FL}/H_{BFL}$ | 50% | 50% | 50% | 50% | 50% | 50% |
| $M_{2FL}$ (MPa) | 6.0 | 6.0 | 6.0 | 6.0 | 6.0 | 6.0 |
| $M_{BFL}$ (MPa) | 10.0 | 10.0 | 10.0 | 10.0 | 10.0 | 10.0 |
| $M_{RFL}$ (MPa) | 9.5 | 9.5 | 9.5 | 9.5 | 9.5 | 9.5 |
| $2.0 \times M_{2FL} > M_{BFL}$ | Satisfy | Satisfy | Satisfy | Satisfy | Satisfy | Satisfy |
| $M_{BFL} > M_{RFL}$ | Satisfy | Satisfy | Satisfy | Satisfy | Satisfy | Satisfy |
| $M_{RFL} > 1.5 \times M_{2FL}$ | Satisfy | Satisfy | Satisfy | Satisfy | Satisfy | Satisfy |
| Ride comfort hardness | 110 | 98 | 110 | 120 | 120 | 101 |
| Run-flat durability | 98 | 105 | 105 | 100 | 105 | 105 |

FIG. 3B

| | Example 5 | Example 6 | Example 7 | Example 8 | Example 9 | Example 10 |
|---|---|---|---|---|---|---|
| $H_{BFL}/SH$ | 25% | 25% | 25% | 30% | 30% | 24% |
| $H_{2FL}/SH$ | 50% | 60% | 61% | 53% | 54% | 60% |
| $H_{2FL}/H_{BFL}$ | 200% | 240% | 244% | 175% | 180% | 250% |
| $S_{2FL}/S_{BFL}$ | 160% | 160% | 160% | 160% | 160% | 160% |
| $S_{ALL}(= S_{2FL} + S_{BFL} + S_{RFL})$ | 970 | 1070 | 1080 | 1050 | 1060 | 1060 |
| $L_{RFL}$ | 10.7 mm | 10.7 mm | 10.7 mm | 12.8 mm | 12.8 mm | 10.2 mm |
| $L_{RFL}/H_{BFL}$ | 35% | 35% | 35% | 35% | 35% | 35% |
| $L_{2FL}$ | 15.3 mm | 15.3 mm | 15.3 mm | 18.3 mm | 18.3 mm | 14.6 mm |
| $L_{2FL}/H_{BFL}$ | 50% | 50% | 50% | 50% | 50% | 50% |
| $M_{2FL}$ (MPa) | 6.0 | 6.0 | 6.0 | 6.0 | 6.0 | 6.0 |
| $M_{BFL}$ (MPa) | 10.0 | 10.0 | 10.0 | 10.0 | 10.0 | 10.0 |
| $M_{RFL}$ (MPa) | 9.5 | 9.5 | 9.5 | 9.5 | 9.5 | 9.5 |
| $2.0 \times M_{2FL} > M_{BFL}$ | Satisfy | Satisfy | Satisfy | Satisfy | Satisfy | Satisfy |
| $M_{BFL} > M_{RFL}$ | Satisfy | Satisfy | Satisfy | Satisfy | Satisfy | Satisfy |
| $M_{RFL} > 1.5 \times M_{2FL}$ | Satisfy | Satisfy | Satisfy | Satisfy | Satisfy | Satisfy |
| Ride comfort hardness | 110 | 101 | 100 | 100 | 101 | 101 |
| Run-flat durability | 101 | 110 | 110 | 105 | 105 | 110 |

FIG. 3C

|  | Example 11 | Example 12 | Example 13 | Example 14 | Example 15 |
|---|---|---|---|---|---|
| $H_{BFL}/SH$ | 24% | 25% | 25% | 25% | 25% |
| $H_{2FL}/SH$ | 60% | 55% | 55% | 55% | 55% |
| $H_{2FL}/H_{BFL}$ | 255% | 220% | 220% | 220% | 220% |
| $S_{2FL}/S_{BFL}$ | 160% | 150% | 200% | 205% | 400% |
| $S_{ALL}(= S_{2FL} + S_{BFL} + S_{RFL})$ | 1060 | 1020 | 1020 | 1020 | 1020 |
| $L_{RFL}$ | 10.2 mm | 10.7 mm | 10.7 mm | 10.7 mm | 10.7 mm |
| $L_{RFL}/H_{BFL}$ | 35% | 35% | 35% | 35% | 35% |
| $L_{2FL}$ | 14.6 mm | 15.3 mm | 15.3 mm | 15.3 mm | 15.3 mm |
| $L_{2FL}/H_{BFL}$ | 50% | 50% | 50% | 50% | 50% |
| $M_{2FL}$ (MPa) | 6.0 | 6.0 | 6.0 | 6.0 | 6.0 |
| $M_{BFL}$ (MPa) | 10.0 | 10.0 | 10.0 | 10.0 | 10.0 |
| $M_{RFL}$ (MPa) | 9.5 | 9.5 | 9.5 | 9.5 | 9.5 |
| $2.0 \times M_{2FL} > M_{BFL}$ | Satisfy | Satisfy | Satisfy | Satisfy | Satisfy |
| $M_{BFL} > M_{RFL}$ | Satisfy | Satisfy | Satisfy | Satisfy | Satisfy |
| $M_{RFL} > 1.5 \times M_{2FL}$ | Satisfy | Satisfy | Satisfy | Satisfy | Satisfy |
| Ride comfort hardness | 100 | 105 | 110 | 100 | 100 |
| Run-flat durability | 110 | 105 | 105 | 105 | 105 |

FIG. 3D

| | Example 16 | Example 17 | Example 18 | Example 19 | Example 20 | Example 21 |
|---|---|---|---|---|---|---|
| $H_{BFL}/SH$ | 25% | 25% | 25% | 25% | 25% | 25% |
| $H_{2FL}/SH$ | 55% | 55% | 55% | 55% | 55% | 55% |
| $H_{2FL}/H_{BFL}$ | 220% | 220% | 220% | 220% | 220% | 220% |
| $S_{2FL}/S_{BFL}$ | 160% | 160% | 160% | 160% | 160% | 160% |
| $S_{ALL}(= S_{2FL} + S_{BFL} + S_{RFL})$ | 880 | 1170 | 1020 | 1020 | 1020 | 1020 |
| $L_{RFL}$ | 10.7 mm | 10.7 mm | 5.8 mm | 6.1 mm | 7.8 mm | 8.0 mm |
| $L_{RFL}/H_{BFL}$ | 35% | 35% | 19% | 20% | 26% | 26% |
| $L_{2FL}$ | 15.3 mm | 15.3 mm | 15.3 mm | 15.3 mm | 15.3 mm | 15.3 mm |
| $L_{2FL}/H_{BFL}$ | 50% | 50% | 50% | 50% | 50% | 50% |
| $M_{2FL}$ (MPa) | 6.0 | 6.0 | 6.0 | 6.0 | 6.0 | 6.0 |
| $M_{BFL}$ (MPa) | 10.0 | 10.0 | 10.0 | 10.0 | 10.0 | 10.0 |
| $M_{RFL}$ (MPa) | 9.5 | 9.5 | 9.5 | 9.5 | 9.5 | 9.5 |
| $2.0 \times M_{2FL} > M_{BFL}$ | Satisfy | Satisfy | Satisfy | Satisfy | Satisfy | Satisfy |
| $M_{BFL} > M_{RFL}$ | Satisfy | Satisfy | Satisfy | Satisfy | Satisfy | Satisfy |
| $M_{RFL} > 1.5 \times M_{2FL}$ | Satisfy | Satisfy | Satisfy | Satisfy | Satisfy | Satisfy |
| Ride comfort hardness | 110 | 100 | 110 | 110 | 110 | 110 |
| Run-flat durability | 100 | 105 | 100 | 101 | 101 | 102 |

FIG. 3E

| | Example 22 | Example 23 | Example 24 | Example 25 | Example 26 |
|---|---|---|---|---|---|
| $H_{BFL}/SH$ | 25% | 25% | 25% | 25% | 25% |
| $H_{2FL}/SH$ | 55% | 55% | 55% | 55% | 55% |
| $H_{2FL}/H_{BFL}$ | 220% | 220% | 220% | 220% | 220% |
| $S_{2FL}/S_{BFL}$ | 160% | 160% | 160% | 160% | 160% |
| $S_{ALL}(= S_{2FL} + S_{BFL} + S_{RFL})$ | 1020 | 1020 | 1020 | 1020 | 1020 |
| $L_{RFL}$ | 15.3 mm | 15.3 mm | 16.0 mm | 16.2 mm | 10.7 mm |
| $L_{RFL}/H_{BFL}$ | 50% | 51% | 52% | 53% | 35% |
| $L_{2FL}$ | 15.3 mm | 15.3 mm | 15.3 mm | 15.3 mm | 9.8 mm |
| $L_{2FL}/H_{BFL}$ | 50% | 50% | 50% | 50% | 32% |
| $M_{2FL}$ (MPa) | 6.0 | 6.0 | 6.0 | 6.0 | 6.0 |
| $M_{BFL}$ (MPa) | 10.0 | 10.0 | 10.0 | 10.0 | 10.0 |
| $M_{RFL}$ (MPa) | 9.5 | 9.5 | 9.5 | 9.5 | 9.5 |
| $2.0 \times M_{2FL} > M_{BFL}$ | Satisfy | Satisfy | Satisfy | Satisfy | Satisfy |
| $M_{BFL} > M_{RFL}$ | Satisfy | Satisfy | Satisfy | Satisfy | Satisfy |
| $M_{RFL} > 1.5 \times M_{2FL}$ | Satisfy | Satisfy | Satisfy | Satisfy | Satisfy |
| Ride comfort hardness | 102 | 101 | 101 | 100 | 110 |
| Run-flat durability | 105 | 105 | 105 | 105 | 100 |

FIG. 3F

| | Example 27 | Example 28 | Example 29 | Example 30 | Example 31 | Example 32 |
|---|---|---|---|---|---|---|
| $H_{BFL}/SH$ | 25% | 25% | 25% | 25% | 25% | 25% |
| $H_{2FL}/SH$ | 55% | 55% | 55% | 55% | 55% | 55% |
| $H_{2FL}/H_{BFL}$ | 220% | 220% | 220% | 220% | 220% | 220% |
| $S_{2FL}/S_{BFL}$ | 160% | 160% | 160% | 160% | 160% | 160% |
| $S_{ALL}(= S_{2FL} + S_{BFL} + S_{RFL})$ | 1020 | 1020 | 1020 | 1020 | 1020 | 1020 |
| $L_{RFL}$ | 10.7 mm | 10.7 mm | 10.7 mm | 10.7 mm | 10.7 mm | 10.7 mm |
| $L_{RFL}/H_{BFL}$ | 35% | 35% | 35% | 35% | 35% | 35% |
| $L_{2FL}$ | 10.0 mm | 11.9 mm | 12.2 mm | 20.0 mm | 20.2 mm | 21.4 mm |
| $L_{2FL}/H_{BFL}$ | 33% | 39% | 40% | 66% | 66% | 70% |
| $M_{2FL}$ (MPa) | 6.0 | 6.0 | 6.0 | 6.0 | 6.0 | 6.0 |
| $M_{BFL}$ (MPa) | 10.0 | 10.0 | 10.0 | 10.0 | 10.0 | 10.0 |
| $M_{RFL}$ (MPa) | 9.5 | 9.5 | 9.5 | 9.5 | 9.5 | 9.5 |
| $2.0 \times M_{2FL} > M_{BFL}$ | Satisfy | Satisfy | Satisfy | Satisfy | Satisfy | Satisfy |
| $M_{BFL} > M_{RFL}$ | Satisfy | Satisfy | Satisfy | Satisfy | Satisfy | Satisfy |
| $M_{RFL} > 1.5 \times M_{2FL}$ | Satisfy | Satisfy | Satisfy | Satisfy | Satisfy | Satisfy |
| Ride comfort hardness | 110 | 110 | 110 | 102 | 101 | 101 |
| Run-flat durability | 101 | 101 | 102 | 105 | 105 | 105 |

FIG. 3G

|  | Example 33 | Example 34 | Example 35 | Example 36 | Example 37 |
|---|---|---|---|---|---|
| $H_{BFL}/SH$ | 25% | 25% | 25% | 25% | 25% |
| $H_{2FL}/SH$ | 55% | 55% | 55% | 55% | 55% |
| $H_{2FL}/H_{BFL}$ | 220% | 220% | 220% | 220% | 220% |
| $S_{2FL}/S_{BFL}$ | 160% | 160% | 160% | 160% | 160% |
| $S_{ALL}(= S_{2FL} + S_{BFL} + S_{RFL})$ | 1020 | 1020 | 1020 | 1020 | 1020 |
| $L_{RFL}$ | 10.7 mm | 10.7 mm | 10.7 mm | 10.7 mm | 10.7 mm |
| $L_{RFL}/H_{BFL}$ | 35% | 35% | 35% | 35% | 35% |
| $L_{2FL}$ | 21.7 mm | 15.3 mm | 15.3 mm | 15.3 mm | 15.3 mm |
| $L_{2FL}/H_{BFL}$ | 71% | 50% | 50% | 50% | 50% |
| $M_{2FL}$ (MPa) | 6.0 | 6.0 | 6.0 | 6.0 | 10.0 |
| $M_{BFL}$ (MPa) | 10.0 | 13.0 | 8.0 | 10.0 | 6.0 |
| $M_{RFL}$ (MPa) | 9.5 | 9.5 | 9.5 | 8.0 | 9.5 |
| $2.0 \times M_{2FL} > M_{BFL}$ | Satisfy | Not Satisfy | Satisfy | Satisfy | Not Satisfy |
| $M_{BFL} > M_{RFL}$ | Satisfy | Satisfy | Not Satisfy | Satisfy | Not Satisfy |
| $M_{RFL} > 1.5 \times M_{2FL}$ | Satisfy | Satisfy | Satisfy | Not Satisfy | Not Satisfy |
| Ride comfort hardness | 100 | 108 | 110 | 110 | 108 |
| Run-flat durability | 105 | 105 | 103 | 103 | 105 |

FIG. 3H

RUN-FLAT TIRE

TECHNICAL FIELD

The present technology relates to a run-flat tire.

BACKGROUND ART

Pneumatic tires are assembled on rims and mounted on a vehicle in a state of being internally inflated with air. When a vehicle is traveling, it is this internal air pressure that bears the load. However, upon a puncture or the like, air escapes from the pneumatic tire, rendering the tire unsuitable to bear the load. Specifically, a load supported by the air pressure comes to be supported by the sidewall portions, causing the sidewall portions to greatly deform. As a result, travel is impeded.

Therefore, as a pneumatic tire capable of so-called run-flat travel wherein a vehicle travels with the air escaping due to a puncture or the like, a run-flat tire provided with a side reinforcing rubber layer on an inner side of the sidewall portions to increase the bending rigidity of the sidewall portions has been known. In other words, the run-flat tire allows travel by suppressing deformation of the sidewall portions to be performed, even in a case in which the air filled therein escapes and a large load acts on the sidewall portions.

Ironically, the run-flat tires involve a risk of compromising run comfort due to the side reinforcing rubber layer provided. Furthermore, it is also important to ensure the durability of the sidewall portions because of a large load they receive during the run-flat travel. In view of this, some known run-flat tires including the side reinforcing rubber layers adopt various solutions to ensure such performances. For example, in run-flat tires described in Japan Patent Nos. 5282794, 6319415, 6249518 and 5835171 and in Japan Unexamined Patent Publication Nos. 2015-205594 and 2017-56815, a sidewall portion is provided with a side reinforcing rubber layer, and a rubber member suitable for the purpose is arranged on the outer side in tire width direction of a turned-up portion of the carcass, to facilitate an attempt to improve the ride comfort performance and durability during the run-flat travel.

Higher rigidity in a tire radial direction is likely to improve the durability of the run-flat tire during run-flat travel, but the higher rigidity in the tire radial direction is also likely to compromise the ride comfort under normal travel conditions. Thus, run-flat durability, which is durability during run-flat travel, and ride comfort performance, which is ride comfort under normal travel conditions are in trade-off relationship, meaning that it is difficult to achieve these performances in a compatible manner.

SUMMARY

The present technology provides a run-flat tire that can achieve the run-flat durability and the ride comfort performance in a compatible manner.

A run-flat tire according to an embodiment of the present technology includes:

sidewall portions disposed on both sides in a tire width direction;

bead portions disposed respectively on an inner side of the sidewall portions in a tire radial direction;

a bead core disposed in each of the bead portions;

a carcass spanning between the bead portions on both sides in the tire width direction, extending to an inner side of the bead core in each of the bead portions in the tire radial direction, and being folded back in the tire width direction;

a side reinforcing rubber layer disposed on a tire inner surface side of the carcass in the sidewall portion;

a first bead filler disposed on an inner side of a turn up portion of the carcass in the tire width direction and on an outer side of the bead core in the tire radial direction, the turned-up portion being a portion folded back to an outer side of the bead core in the tire width direction; and a second bead filler disposed on an outer side of the turn up portion in the tire width direction, the first bead filler being arranged to overlap the side reinforcing rubber layer with the carcass provided in-between, the first bead filler having a first bead filler height being a height in the tire radial direction, from a reference position on an inner side of a tire cross-sectional height in the tire radial direction to an outer side end portion of the first bead filler in the tire radial direction, the first bead filler height being 30% or less of the tire cross-sectional height, the second bead filler being arranged to overlap the first bead filler with the carcass provided in-between, the second bead filler having a second bead filler height being a height in the tire radial direction, from the reference position to an outer side end portion of the second bead filler in the tire radial direction, the second bead filler height being 50% or greater of the tire cross-sectional height, in the first bead filler and the second bead filler, a cross-sectional area of the second bead filler in a tire meridian cross-section being in a range of from 150% or greater to 400% or less of a cross-sectional area of the first bead filler in the tire meridian cross-section, and the side reinforcing rubber layer, the first bead filler, and the second bead filler satisfying a relationship $(0.16 \times SH \times LI - 1100) \leq S_{ALL} \leq (0.16 \times SH \times LI - 800)$, $S_{ALL}$ representing a sum of cross-sectional areas, in the tire meridian cross-section, of the side reinforcing rubber layer, the first bead filler, and the second bead filler located on one side of a tire equatorial plane in the tire width direction, SH representing the tire cross-sectional height, and LI representing a load index.

In the run-flat tire described above, preferably the first bead filler height is in a range of from 23% or greater to 30% or less of the tire cross-sectional height, the second bead filler height is in a range of from 50% or greater to 60% or less of the tire cross-sectional height and in a range of from 180% or greater to 250% or less of the first bead filler height, and the cross-sectional area of the second bead filler in the tire meridian cross-section is in a range of from 150% or greater to 200% or less of the cross-sectional area of the first bead filler in the tire meridian cross-section.

In the run-flat tire described above, preferably an overlapping amount of the side reinforcing rubber layer and the first bead filler overlapping with the carcass provided in-between is in a range of from 20% or greater to 50% or less of the first bead filler height, and an overlapping amount of the first bead filler and the second bead filler overlapping with the carcass provided in-between is in a range of from 40% or greater to 70% or less of the first bead filler height.

In the run-flat tire described above, preferably an overlapping amount of the side reinforcing rubber layer and the first bead filler overlapping with the carcass provided in-between is in a range of from 8 mm or greater to 16 mm or less, and an overlapping amount of the first bead filler and the second bead filler overlapping with the carcass provided in-between is in a range of from 10 mm or greater to 20 mm or less.

In the run-flat tire described above, preferably the side reinforcing rubber layer, the first bead filler, and the second bead filler satisfy a relationship $M_{BFL} > M_{RFL} > M_{2FL}$, where $M_{RFL}$ represents a modulus of the side reinforcing rubber layer at 100% elongation, $M_{BFL}$ represents a modulus of the first bead filler at 100% elongation, and $M_{2FL}$ represents a modulus of the second bead filler at 100% elongation.

In the run-flat tire described above, preferably the side reinforcing rubber layer, the first bead filler, and the second bead filler satisfy a relationship $(2.0 \times M_{2FL}) > M_{BFL} > M_{RFL} > (1.5 \times M_{2FL})$, where $M_{RFL}$ represents a modulus of the side reinforcing rubber layer at 100% elongation, $M_{BFL}$ represents a modulus of the first bead filler at 100% elongation, and $M_{2FL}$ represents a modulus of the second bead filler at 100% elongation.

In the run-flat tire described above, preferably the tire cross-sectional height is 100 mm or greater.

In the run-flat tire described above, preferably the first bead filler height is in a range of from 24 mm or greater to 33 mm or less.

In the run-flat tire described above, preferably the second bead filler height is in a range of from 54 mm or greater to 78 mm or less.

In the run-flat tire described above, preferably in the first bead filler and the second bead filler, a difference between the first bead filler height and the second bead filler height is 30% or greater of the tire cross-sectional height.

The run-flat tire according to an embodiment of the present technology allows run-flat durability and ride comfort performance to be achieved in a compatible manner.

BRIEF DESCRIPTION OF DRAWINGS

FIGS. 3A to 3H are tables showing results of performance evaluation tests of run-flat tires.

DETAILED DESCRIPTION

A run-flat tire according to an embodiment of the present technology is described in detail below with reference to the drawings. However, the present technology is not limited by the embodiment. Constituents of the following embodiments include elements that are essentially identical or that can be substituted or easily conceived of by a person skilled in the art.

Embodiments

Figure 1:
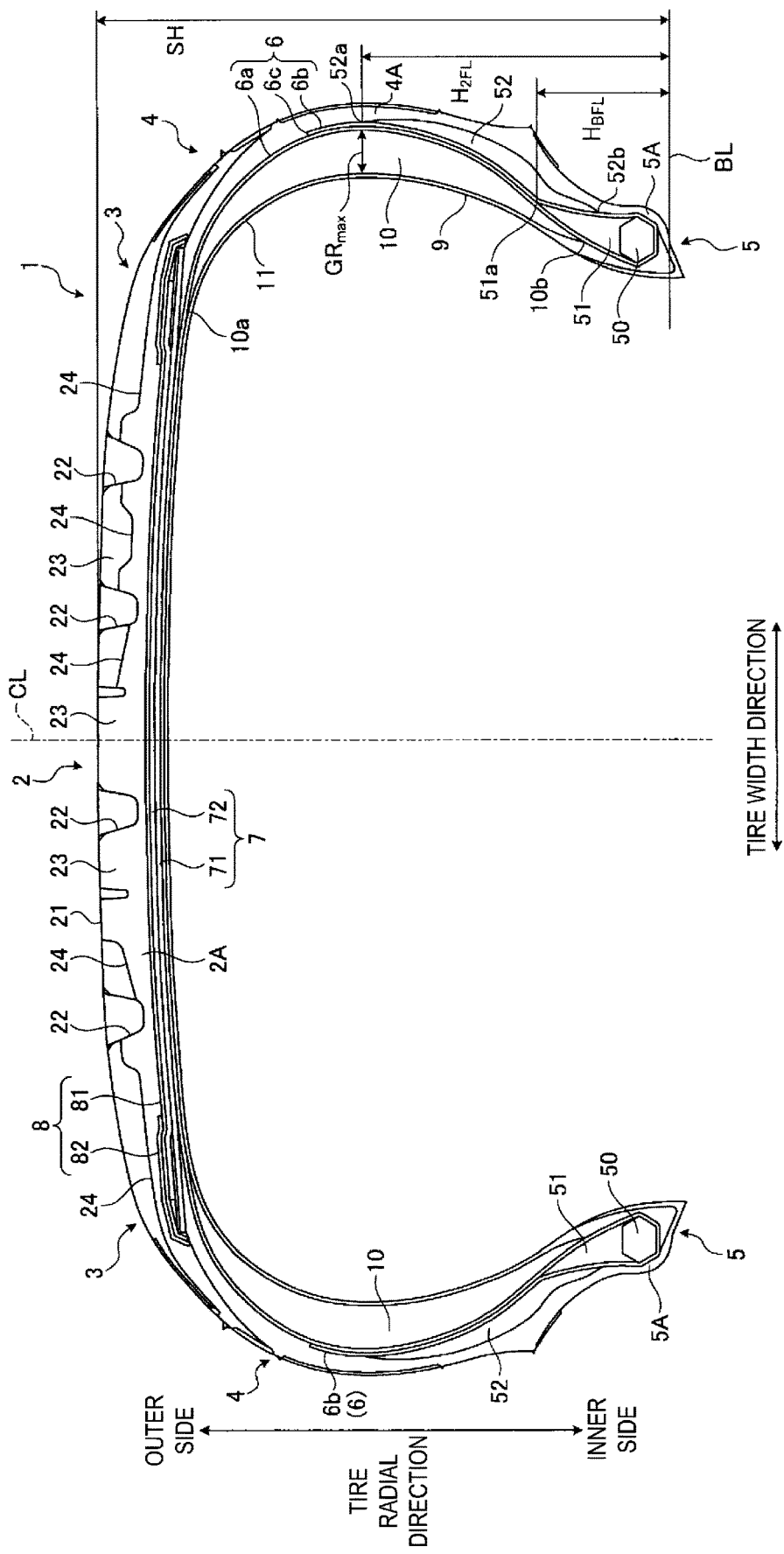
FIG. 1 is a meridian cross-sectional view of a main part of a run-flat tire according to the present embodiment.

FIG. 1 is a meridian cross-sectional view of a main part of a run-flat tire 1 according to the present embodiment. Herein, "tire radial direction" refers to the direction orthogonal to the tire rotation axis (not illustrated) of the run-flat tire 1 configured as a pneumatic tire. "Inner side in tire radial direction" refers to a side toward the tire rotation axis in the tire radial direction. "Outer side in tire radial direction" refers to a side away from the tire rotation axis in the tire radial direction. "Tire circumferential direction" refers to the circumferential direction with the tire rotation axis as the center axis. Additionally, "tire width direction" refers to a direction parallel with the tire rotation axis. "Inner side in the tire width direction" refers to a side toward a tire equatorial plane (tire equatorial line) CL in the tire width direction. "Outer side in the tire width direction" refers to a side away from the tire equatorial plane CL in the tire width direction. "Tire equatorial plane CL" refers to a plane orthogonal to the tire rotation axis of the run-flat tire 1, the plane passing through the center of the tire width of the run-flat tire 1. "Tire width" is the width in the tire width direction between portions located on the outermost in the tire width direction, or in other words, the distance between the portions that are the most distant from the tire equatorial plane CL in the tire width direction. "Tire equatorial line" refers to a line along the tire circumferential direction of the run-flat tire 1 that lies on the tire equatorial plane CL. In the present embodiment, the tire equatorial line and the tire equatorial plane are denoted by the same reference sign CL.

As illustrated in FIG. 1, the run-flat tire 1 of the present embodiment includes a tread portion 2, shoulder portions 3 on both sides of the tread portion 2 in the tire width direction, and sidewall portions 4 and bead portions 5 continuing from the shoulder portions 3 in that order. The run-flat tire 1 also includes a carcass 6, a belt layer 7, a belt cover 8, an innerliner 9, and a side reinforcing rubber layer 10.

The tread portion 2 includes tread rubber 2A that is a rubber member and is exposed on the outermost side of the run-flat tire 1 in the tire radial direction. Thus, a surface of the tread portion 2 constitutes a part of a contour of the run-flat tire 1. A tread surface 21 is formed on an outer circumferential surface of the tread portion 2, in other words, on a road contact surface that comes into contact with a road surface when running. The tread surface 21 is provided with a plurality of main grooves 22 extending along the tire circumferential direction and being straight main grooves in parallel with the tire equatorial line CL. On the tread surface 21, a plurality of land portions 23 extending along the tire circumferential direction are formed by these plurality of main grooves 22. Note that the main grooves 22 may be formed to be bent or curved in the tire width direction, while extending along the tire circumferential direction.

Additionally, in the tread portion 2, lug grooves 24 that extend in a direction intersecting the tire circumferential direction are provided in the land portions 23 of the tread surface 21. The lug grooves 24 may communicate with the main grooves 22. Alternatively, the lug grooves 24 may include at least one end that does not communicate with the main grooves 22 and terminates within the land portion 23. When both ends of the lug grooves 24 communicate with the main grooves 22, the land portions 23 are formed into a block shape divided in the tire width direction and in the tire circumferential direction by the main grooves 22 and the lug grooves 24. The lug grooves 24 may be inclined in the tire circumferential direction while extending in the tire width direction, or be bent or curved in the tire circumferential direction while extending in the tire width direction.

The shoulder portions 3 are portions on both outer sides of the tread portion 2 in the tire width direction and include the tread rubber 2A, which is a rubber material forming the tread portion 2. Additionally, the sidewall portions 4 are disposed on both sides of the tread portion 2 in the tire width direction to be provided as a pair, and the pair of sidewall portions 4 are formed to extend to the inner side in the tire radial direction from the shoulder portions 3. Thus, the sidewall portions 4 thus formed are portions exposed on the outermost side of the run-flat tire 1 in the tire width direction, and include side rubber 4A that is a rubber material.

Additionally, the bead portions 5 are disposed on the inner side of the pair of respective sidewall portions 4 in the tire radial direction. Thus, the bead portions 5, as well as the sidewall portions 4, are provided in pairs. A bead core 50 and a first bead filler 51 are disposed in each of the pair of bead portions 5. Additionally, a second bead filler 52 is disposed in the tire radial direction from a position where the bead portion 5 is disposed, that is, toward the outer side in the tire radial direction. Of these components, the bead core 50 is formed by winding a bead wire, which is a steel wire, into a ring shape. The first bead filler 51 is a rubber member disposed along the carcass 6 and has a JIS-A hardness at 20° C. in a range of from 68 or greater to 99 or less.

This JIS-A hardness is the durometer hardness measured in accordance with JIS (Japanese Industrial Standard) K-6253 using a type A durometer and under a temperature of 20° C.

The carcass 6 spans between the bead portions 5 disposed on both sides in the tire width direction in a toroidal shape, forming the framework of the run-flat tire 1. Specifically, the carcass 6 is disposed from one bead portion 5 to the other bead portion 5 in the pair of bead portions 5 located on both sides in the tire width direction. The carcass 6 at or near both end portions thereof extends to the inner side of the bead core 50 in the tire radial direction and is folded back in the tire width direction in the bead portion 5 so as to wrap around the bead core 50 and the first bead filler 51. Specifically, the carcass 6 includes: a carcass body portion 6a extending from the tread portion 2 to the bead portion 5 through the sidewall portion 4 and spanning between the pair of bead portions 5; and a turned-up portion 6b continuing from the carcass body portion 6a and folded back to the outer side in the tire width direction. Of these, the turned-up portion 6b is formed continuously from the carcass body portion 6a, extends from the inner side of the bead core 50 in the tire width direction to the inner side of the bead core 50 in the tire radial direction in the bead portion 5, is folded back toward the outer side of the bead core 50 in the tire width direction, and is overlapped on the carcass body portion 6a on the outer side of the bead core 50 in the tire radial direction.

The carcass 6 thus formed is formed by coating carcass cords made of steel or organic fibers, such as aramid, nylon, polyester, rayon, or the like with a coating rubber and performing a rolling process on it. The carcass cords of the carcass 6 are provided to extend along a tire meridian direction, with an inclination angle, within a predetermined range, toward the tire circumferential direction. Specifically, a plurality of carcass cords of the carcass 6 are arranged side by side with a carcass angle being in a range of from 80° or greater to 90° or less, the carcass angle being defined as an inclination angle of the carcass cord in the longitudinal direction with respect to the tire circumferential direction.

The first bead filler 51 of the bead portion 5 is disposed on the inner side of the turned-up portion 6b of the carcass 6 in the tire width direction and on the outer side of the bead core 50 in the tire radial direction. In other words, the first bead filler 51 is disposed on the outer side of the bead core 50 in the tire radial direction, in a portion defined by the carcass body portion 6a and the turned-up portion 6b of the carcass 6 and the bead core 50, in a tire meridian cross-section.

The second bead filler 52 is disposed along the carcass 6 on the outer side of the turned-up portion 6b of the carcass 6 in the tire width direction. Thus, the second bead filler 52 is sandwiched between the turned-up portion 6b of the carcass 6 and the side rubber 4a in the tire width direction. An outer side end portion 52a of the second bead filler 52 in the tire radial direction is positioned more on the outer side in the tire radial direction than an outer side end portion 51a of the first bead filler 51 in the tire radial direction. An inner side end portion 52b of the second bead filler 52 in the tire radial direction is positioned more on the inner side in the tire radial direction than the outer side end portion 51a of the first bead filler 51. The second bead filler 52 thus arranged is made of a rubber material and has a JIS-A hardness at 20° C. in a range of from 69 or greater to 94 or less.

The turned-up portion 6b of the carcass 6 has an end portion 6c in the tire radial direction positioned more on the outer side in the tire radial direction than the first bead filler 51. Thus, the turned-up portion 6b is provided to extend from the bead portion 5 toward the sidewall portion 4 and covers the entirety of the first bead filler 51.

The bead portions 5 each include a rim cushion rubber 5A that is a rubber member exposed at a portion on the tire outer side that comes into contact with a rim (not illustrated). The rim cushion rubber 5A forms an outer circumference of the bead portion 5, extends over the inner side in the tire radial direction to be in contact with the rim from the inner side of the bead portion 5 in the tire width direction, and is arranged to cover a part of a portion of the second bead filler 52 in the tire radial direction arranged on the outer side of the carcass 6 in the tire width direction.

The belt layer 7 is formed by laminating a plurality of belt plies 71 and 72 in the tire radial direction. The belt layer 7 is disposed on the outer side of the carcass 6 in the tire radial direction and is disposed around the outer circumference of the carcass 6. In the present embodiment, the belt layer 7 includes two layers of the belt plies 71 and 72. The two layers of belt plies 71 and 72 are made by performing a rolling process on a plurality of belt cords made from steel or an organic fiber material and covered with coating rubber, and a belt angle defined as an inclination angle in extension directions of the belt cords toward the tire width direction with respect to the tire circumferential direction is in a range of from 20° or greater to 35° or less. The two layers of belt plies 71 and 72 are configured as a so-called crossply structure, by being layered with the extension directions of the belt cords intersecting with one another, with their belt angles having opposite signs. Thus, inclination directions of the belt cords of the two layers of belt plies 71 and 72, toward the tire width direction with respect to the tire circumferential direction, are opposite to each other.

The belt cover 8 is disposed on the outer side in the tire radial direction of the belt layer 7. The belt cover 8 is made by performing a rolling process on a plurality of cords covered with coating rubber and made from steel or an organic fiber material. The belt angle of the belt cover 8 toward the tire width direction with respect to the tire circumferential direction is in a range of ±5 degrees. The belt cover 8 is arranged on the outer side in the tire radial direction of the belt layer 7 to be layered on the belt plies 71 and 72 and is disposed at least in a range where the belt plies 71 and 72 of the belt layer 7 are disposed in the tire width direction.

In the present embodiment, the belt cover 8 includes: a belt full cover 81 that entirely covers the belt layer 7; and a belt edge cover 82 that covers the end portion of the belt layer 7 in the tire width direction. Of these, the belt edge cover 82 is configured by winding a band-like strip material, having a width of about 10 mm, for example, in the tire circumferential direction. The configuration of the belt cover 8 is not limited to the one described above. For example, only the belt full cover 81 may be provided, only the belt edge cover 82 may be provided, or a plurality of the belt full covers 81 and a plurality of the belt edge covers 82 may be provided.

The innerliner 9 is an air permeation preventing layer that is disposed on a tire inner surface 11, which is a surface of the run-flat tire 1 on the tire inner side, to cover the carcass 6. The innerliner 9 prevents leakage of air filled in the run-flat tire 1 and suppresses oxidation due to exposure of the carcass 6. Specifically, the innerliner layer 9 is disposed on the tire inner surface 11 side of the carcass 6 and has both end portions in the tire width direction reaching the positions of the pair of bead portions 5, where the innerliner 9 is rolled in the tire circumferential direction in a toroidal shape.

The side reinforcing rubber layer 10 is a rubber member provided inside the sidewall portion 4 and is disposed without being exposed on the tire inner surface 11 or a surface on the tire outer side of the run-flat tire 1. Specifically, the side reinforcing rubber layer 10 is located mainly on the inner side in the tire width direction of each of the portions of the carcass 6 located at the sidewall portions 4 and is disposed between the carcass 6 and the innerliner 9 in the sidewall portion 4. Thus, the side reinforcing rubber layer 10 is disposed on the tire inner surface 11 side of the carcass 6 in the sidewall portion 4.

In the tire meridian cross-section, the side reinforcing rubber layer 10 is formed in a crescent shape projecting to the outer side in the tire width direction. The side reinforcing rubber layer 10 formed in a crescent shape includes an outer side end portion 10a, which is an end portion on the outer side in the tire radial direction, positioned on the inner side in the tire radial direction of the belt layer 7 in the tread portion 2. Thus, a predetermined range of the side reinforcing rubber layer 10 at or near the outer side end portion 10a is disposed to overlap the belt layer 7 in the tire radial direction.

The side reinforcing rubber layer 10 includes an inner side end portion 10b, which is an end portion on the inner side in the tire radial direction, positioned more on the outer side in the tire radial direction than the position of the bead core 50 of the bead portion 5 in the tire radial direction, and positioned more on the inner side in the tire radial direction than the outer side end portion 51a of the first bead filler 51. The inner side end portion 10b of the side reinforcing rubber layer 10 is positioned more on the outer side in the tire radial direction than the inner side end portion 52b of the second bead filler 52.

The side reinforcing rubber layer 10 formed in a crescent shape in the meridian cross-section of the run-flat tire 1 has a position of a maximum thickness GRmax located in a range of from 40% or greater to 70% or less of a tire cross-sectional height SH on the outer side in the tire radial direction, from a rim diameter reference position BL as a reference position of the tire cross-sectional height SH on the inner side in the tire radial direction. The maximum thickness GRmax of the side reinforcing rubber layer 10 is in a range of from 6.0 mm or greater to 11.5 mm or less.

The tire cross-sectional height SH here is the distance in the tire radial direction between the rim diameter reference position BL and the portion of the tread portion 2 that is located on the outermost side in the tire radial direction. The rim diameter reference position BL here is a line in the tire axial direction that passes through the rim diameter defined by the JATMA standard.

In other words, the tire cross-sectional height SH is obtained by mounting the run-flat tire 1 on a regular rim and filling the regular internal pressure, and is ½ of the difference between the tire outer diameter and the rim diameter when no load is applied to the run-flat tire 1. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. The run-flat tire 1 according to the present embodiment has the tire cross-sectional height SH thus defined being 100 mm or greater. More specifically, the tire cross-sectional height SH of the run-flat tire 1 according to the present embodiment is in a range of from 100 mm or greater to 140 mm or less.

The side reinforcing rubber layer 10 is formed of a rubber material that has a strength greater than that of the side rubber 4A of the sidewall portions 4 or that of the rim cushion rubber 5A of the bead portions 5. Specifically, the side rubber 4A has a JIS-A hardness at 20° C. in a range of from 50 or greater to 59 or less, and the rim cushion rubber 5A has a JIS-A hardness at 20° C. in a range of from 66 or greater to 74 or less. Meanwhile, the side reinforcing rubber layer 10 has a JIS-A hardness at 20° C. in a range of from 72 or greater to 82 or less.

Figure 2:
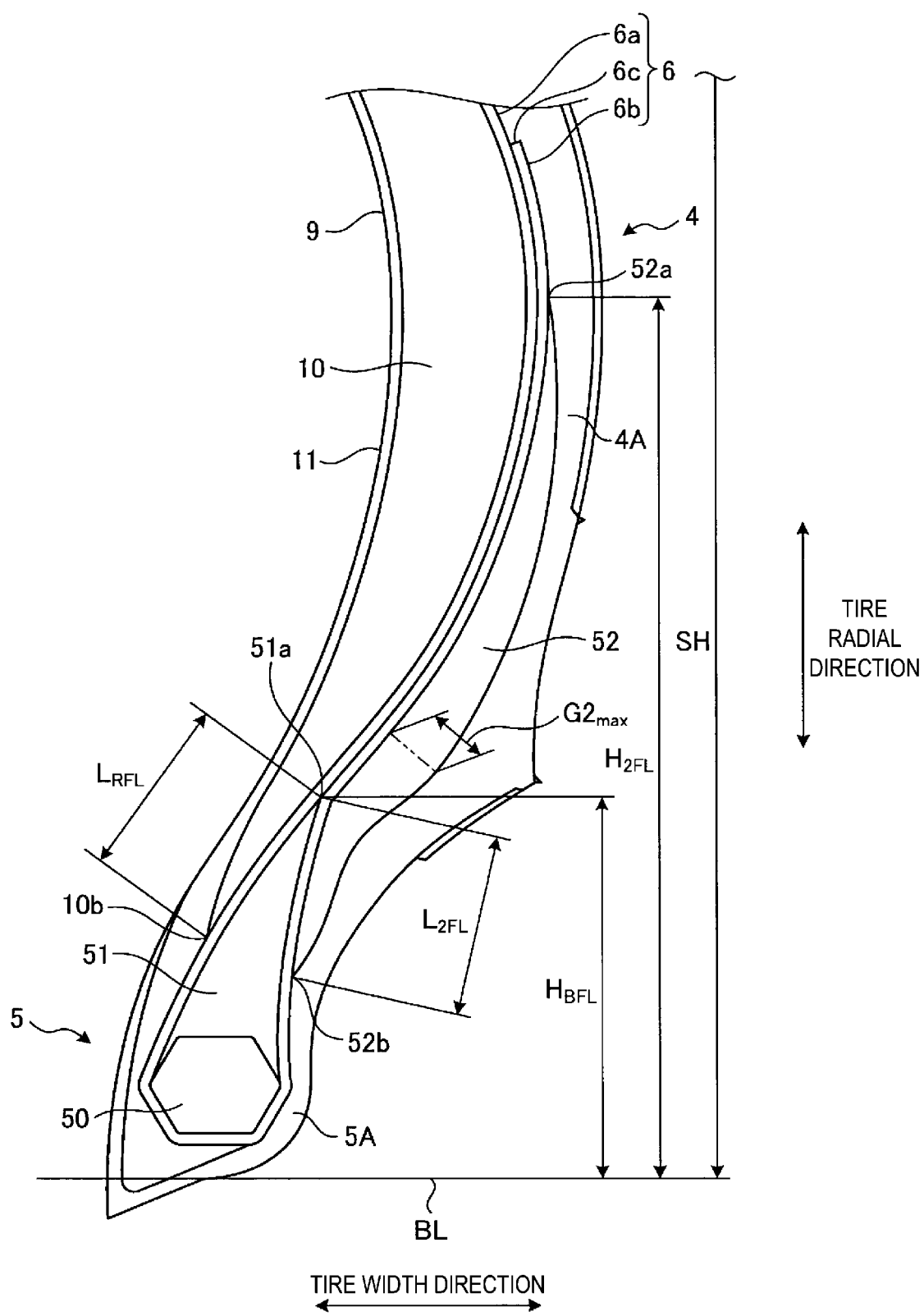
FIG. 2 is a detailed view at or near a bead portion illustrated in FIG. 1.

FIG. 2 is a detailed view at or near the bead portion 5 illustrated in FIG. 1. The first bead filler 51 and the second bead filler 52 are disposed with a height in the tire radial direction being within a predetermined range with respect to the tire cross-sectional height SH. Specifically, the first bead filler 51 has a first bead filler height $H_{BFL}$, which is a height in the tire radial direction from the rim diameter reference position BL to the outer side end portion 51a of the first bead filler 51, being 30% or less of the tire cross-sectional height SH. The second bead filler 52 has a second bead filler height $H_{2FL}$, which is a height in the tire radial direction from the rim diameter reference position BL to the outer side end portion 52a of the second bead filler 52, being 50% or greater of the tire cross-sectional height SH. In the first bead filler 51 and the second bead filler 52, a difference between the first bead filler height $H_{BFL}$ and the second bead filler height $H_{2FL}$ is 30% or greater of the tire cross-sectional height SH.

Note that the first bead filler height $H_{BFL}$ is preferably in a range of from 23% or greater to 30% or less of the tire cross-sectional height SH, and the second bead filler height $H_{2FL}$ is preferably in a range of from 50% or greater to 60% or less of the tire cross-sectional height SH. The second bead filler height $H_{2FL}$ is preferably in a range of from 180% or greater to 250% or less of the first bead filler height $H_{BFL}$. Furthermore, the first bead filler height $H_{BFL}$ is preferably in a range of from 24 mm or greater to 33 mm or less, and the second bead filler height $H_{2FL}$ is preferably in a range of from 54 mm or greater to 78 mm or less.

The first bead filler 51 has the outer side end portion 51a positioned more on the outer side in the tire radial direction than the inner side end portion 10b of the side reinforcing rubber layer 10, and thus the first bead filler 51 is arranged to overlap the side reinforcing rubber layer 10 in the tire radial direction with the carcass 6 provided in-between. Specifically, the first bead filler 51 overlaps the side reinforcing rubber layer 10 in the tire radial direction with the carcass body portion 6a provided in-between, which is a portion of the carcass 6 on the inner side in the tire width direction of the first bead filler 51, and is arranged to overlap the side reinforcing rubber layer 10 in the tire width direction with the carcass body portion 6a provided in-between. The second bead filler 52 has the inner side end portion 52b positioned more on the inner side in the tire radial direction than the outer side end portion 51a of the first bead filler 51, and thus the second bead filler 52 is arranged to overlap the first bead filler 51 in the tire radial direction with the carcass 6 provided in-between. Specifically, the second bead filler 52 overlaps the first bead filler 51 in the tire radial direction with the turned-up portion 6b provided in-between, which is a portion of the carcass 6 on the outer side in the tire width direction of the first bead filler 51, and is arranged to overlap the first bead filler 51 in the tire width direction with the turned-up portion 6b provided in-between.

An overlapping amount $L_{RFL}$ of the side reinforcing rubber layer 10 and the first bead filler 51 overlapping with the carcass 6 provided in-between is in a range of from 20% or greater to 50% or less of the first bead filler height $H_{BFL}$. In this case, the overlapping amount $L_{RFL}$ is a linear distance between the inner side end portion 10b of the side reinforcing rubber layer 10 and the outer side end portion 51a of the first bead filler 51 in the tire meridian cross-section. An overlapping amount $L_{2FL}$ of the first bead filler 51 and the second bead filler 52 overlapping with the carcass 6 provided in-between is in a range of from 40% or greater to 70% or less of the first bead filler height $H_{BFL}$. In this case, the overlapping amount $L_{2FL}$ is a linear distance between the outer side end portion 51a of the first bead filler 51 and the inner side end portion 52b of the second bead filler 52 in the tire meridian cross-section.

The overlapping amount $L_{RFL}$ of the side reinforcing rubber layer 10 and the first bead filler 51 is preferably in a range of from 8 mm or greater to 16 mm or less. The overlapping amount $L_{2FL}$ of the first bead filler 51 and the second bead filler 52 is preferably in a range of from 10 mm or greater to 20 mm or less. The side reinforcing rubber layer 10, the first bead filler 51, and the second bead filler 52 are preferably arranged with the overlapping amount $L_{2FL}$ of the first bead filler 51 and the second bead filler 52 being greater than the overlapping amount $L_{RFL}$ of the side reinforcing rubber layer 10 and the first bead filler 51.

The first bead filler 51 has a thickness decreasing from the inner side toward the outer side in the tire radial direction. Additionally, the thickness of the second bead filler 52 decreases toward the outer side end portion 52a at or near the outer side end portion 52a, and decreases toward the inner side end portion 52b at or near the inner side end portion 52b. The second bead filler 52 with the thickness decreasing at or near both ends in the tire radial direction has a maximum thickness G2max being in a range of from 2.5 mm or greater to 6.5 mm or less. The second bead filler 52 has a position of the maximum thickness G2max located in a range of from 40% or greater to 85% or less of the second bead filler height $H_{2FL}$ on the outer side in the tire radial direction, from the rim diameter reference position BL.

In the first bead filler 51 and the second bead filler 52 thus arranged, the second bead filler 52 has a cross-sectional area $S_{2FL}$ that is greater than a cross-sectional area $S_{BFL}$ of the first bead filler 51 in the tire meridian cross-section. Specifically, in the first bead filler 51 and the second bead filler 52, the cross-sectional area $S_{2FL}$ of the second bead filler 52 in the tire meridian cross-section is in a range of from 150% or greater to 400% or less of the cross-sectional area $S_{BFL}$ of the first bead filler 51 in the tire meridian cross-section. Preferably, the cross-sectional area $S_{2FL}$ of the second bead filler 52 in the tire meridian cross-section is in a range of from 150% or greater to 200% or less of the cross-sectional area $S_{BFL}$ of the first bead filler 51 in the tire meridian cross-section.

The side reinforcing rubber layer 10, the first bead filler 51, and the second bead filler 52 satisfy $(0.16 \times SH \times LI - 1100) \leq S_{ALL} \leq (0.16 \times SH \times LI - 800)$, where $S_{ALL}$ represents a sum of the cross-sectional areas, in the tire meridian cross-section, of the side reinforcing rubber layer 10, the first bead filler 51, and the second bead filler 52 located on one side of the tire equatorial plane CL in the tire width direction, SH represents the tire cross-sectional height, and LI represents a load index of the run-flat tire 1. Specifically, the sum $S_{ALL}$ in this case is the sum of cross-sectional areas of portions, of the side reinforcing rubber layers 10, the first bead fillers 51, and the second bead fillers 52 located on both sides of the tire equatorial plane CL in the tire width direction, located on one side of the tire equatorial plane CL and located on one side of the tire rotation axis in the tire radial direction in the tire meridian cross-section. As the tire cross-sectional height SH, a value in a unit of mm is used. As the sum $S_{ALL}$ of the cross-sectional areas, a value in a unit of $mm^2$ is used.

Note that the load index LI referred to herein is an index representing the load capacity of the tire, and is a "load index" defined by JATMA or a "Load Index" defined by ETRTO. The load index LI includes both standard load and extra load as defined by ETRTO.

The side reinforcing rubber layer 10, the first bead filler 51, and the second bead filler 52 satisfy a relationship $M_{BFL} > M_{RFL} > M_{2FL}$, where $M_{RFL}$ represents a modulus of the side reinforcing rubber layer 10 at 100% elongation, $M_{BFL}$ represents a modulus of the first bead filler 51 at 100% elongation, and $M_{2FL}$ represents a modulus of the second bead filler 52 at 100% elongation. Of these values, the modulus $M_{2FL}$ of the second bead filler 52 at 100% elongation is in a range of from 5.3 MPa or greater to 6.1 MPa or less. The modulus at 100% elongation in this case is measured in a tensile test at 23° C. in conformance with JIS K6251 (using a dumbbell No. 3) and indicates tensile stress at 100% elongation.

The modulus $M_{RFL}$ of the side reinforcing rubber layer 10 at 100% elongation, the modulus $M_{BFL}$ of the first bead filler 51 at 100% elongation, and the modulus $M_{2FL}$ of the second bead filler 52 at 100% elongation preferably satisfy a relationship $(2.0 \times M_{2FL}) > M_{BFL} > M_{RFL} > (1.5 \times M_{2FL})$.

When the run-flat tire 1 according to the present embodiment is mounted on a vehicle, the run-flat tire 1 is mounted on a rim wheel by fitting the rim wheel to the bead portion 5 and is mounted on the vehicle in a state of being inflated by the air filled therein. When a vehicle having the run-flat tire 1 mounted thereon travels, the run-flat tire 1 rotates while a portion of the tread surface 21 located downward of the tread surface 21 contacts the road surface. The vehicle is driven by transferring a driving force or a braking force to the road surface, using the frictional force between the tread surface 21 and the road surface, or by generating a turning force. For example, in a case where the driving force is transferred to the road surface, power generated by a prime mover such as an engine of the vehicle is transferred to the rim wheel, transferred from the rim wheel to the bead portion 5, and then transferred to the run-flat tire 1.

While the run-flat tire 1 is used, loads in various directions act on the parts as described above. The loads are received by the pressure of the air filled inside the run-flat tire 1, the carcass 6 provided as the framework of the run-flat tire 1, and the like. For example, due to the weight of the vehicle and the recesses and protrusions of the road surface, the load acting in the tire radial direction between the tread portion 2 and the bead portion 5 is mainly received by the pressure of the air filled inside the run-flat tire 1 or deflection of the sidewall portion 4 or the like. In other words, the air filled inside the run-flat tire 1 acts as a force that expands the run-flat tire 1 outward from the inside. During traveling of a vehicle, the run-flat tire 1 receives a large load thanks to the biasing force to the outward direction from the inside by the air filled therein and travels while the sidewall portion 4 or the like is appropriately deflected, whereby the vehicle can travel while ensuring riding comfort.

Here, the air inside the run-flat tire 1 may escape, for example, due to a puncture when a foreign material sticks into the tread surface 21. When the air inside escapes, since the air pressure decreases and the biasing force due to the air from the inside of the run-flat tire 1 to the outward direction decreases, it is difficult for the internal air pressure to receive the load during traveling of the vehicle. In this case, in the run-flat tire 1 according to the present embodiment, a part of the load that is difficult to receive by the air pressure can be received by the side reinforcing rubber layer 10 provided in the sidewall portion 4. In other words, since the side reinforcing rubber layer 10 is formed from a rubber material having higher strength than the side rubber 4A forming the sidewall portion 4, the side reinforcing rubber layer 10 can suppress deformation of the sidewall portion 4 in the tire radial direction even if a large load in the tire radial direction acts on the sidewall portion 4.

The side reinforcing rubber layer 10 includes a portion at or near the outer side end portion 10a arranged to overlap the belt layer 7, and includes a portion at or near the inner side end portion 10b arranged to overlap the first bead filler 51 in the tire radial direction with the carcass 6 provided in-between. As a result, the side reinforcing rubber layer 10 can appropriately receive a load acting in the tire radial direction between the tread portion 2 and the bead portion 5, whereby a load acting on the side rubber 4A can be reduced and the stress of the side rubber 4A can be reduced.

The second bead filler 52 is arranged on the outer side in the tire width direction of the turned-up portion 6b of the carcass 6, and thus the second bead filler 52 is arranged to overlap the first bead filler 51 in the tire radial direction with the carcass 6 provided in-between. The second bead filler height $H_{2FL}$ of the second bead filler 52 is 50% or greater of the tire cross-sectional height SH. Thus, the second bead filler 52 is arranged over a wide range in the sidewall portion 4 in the tire radial direction, from the position of the bead portion 5 in the tire radial direction. Thus, the rigidity of the section from the bead portion 5 to the sidewall portion 4 is also enhanced by the second bead filler 52, and the second bead filler 52 can also receive a part of the load acting in the tire radial direction between the tread portion 2 and the bead portion 5. With such configurations, the run-flat tire 1 can suppress excessive deflection of the sidewall portion 4 due to the weight of the vehicle or the like, even if the internal air pressure drops, and thus can perform so-called run-flat travel wherein a vehicle travels with the air escaping.

The state where the run-flat tire 1 is capable of run-flat travel is a state where each bead portion 5 is positioned and assembled on a regular rim, so as to bring the run-flat tire 1 into an unloaded state or a state equivalent to the unloaded state, whereby in the unloaded state, the run-flat tire 1 is assembled on the regular rim and has an internal pressure of 0 kPa.

With the side reinforcing rubber layer 10 thus arranged on the sidewall portion 4, the run-flat tire 1 according to the present embodiment can perform the run-flat travel. However, the rubber material forming the side reinforcing rubber layer 10 has a higher strength than the rubber material forming the side rubber 4A, and thus the sidewall portion 4 might have an excessively high rigidity in the tire radial direction. In case of the sidewall portion 4 having an excessively high rigidity in the tire radial direction, the sidewall portion 4 is difficult to deflect in the tire radial direction under normal travel conditions with the run-flat tire 1 filled with air inside, and thus the ride comfort is likely to be compromised.

In view of this, in the run-flat tire 1 according to the present embodiment, the first bead filler height $H_{BFL}$ is 30% or less of the tire cross-sectional height SH, whereby the rigidity of the first bead filler 51 in the tire radial direction can be prevented from becoming excessively high. With this configuration, the rigidity of the sidewall portion 4 and the bead portion 5 in the tire radial direction can be prevented from becoming excessively high, whereby the ride comfort can be prevented from being compromised.

The side reinforcing rubber layer 10 and the first bead filler 51 are arranged to overlap each other with the carcass 6 provided in-between. Furthermore, the first bead filler 51 and the second bead filler 52 are also arranged to overlap each other with the carcass 6 provided in-between. Thus, the rigidity in the tire radial direction can be prevented from being large. In other words, the side reinforcing rubber layer 10 and the first bead filler 51 are separated by the carcass body portion 6a, and the first bead filler 51 and the second bead filler 52 are separated by the turned-up portion 6b, whereby these rubber members can be relatively easily deformed in the tire radial direction. Thus, deflective deformation in the tire radial direction in response to a load in the tire radial direction acting on the sidewall portion 4 can be facilitated, whereby the ride comfort can be prevented from being compromised.

The cross-sectional area $S_{2FL}$ of the second bead filler 52 in the tire meridian cross-section is in a range of from 150% or greater to 400% or less of the cross-sectional area $S_{BFL}$ of the first bead filler 51 in the tire meridian cross-section. Thus, the rigidity during the run-flat travel can be ensured, while preventing the ride comfort under normal travel conditions from being compromised. In other words, when the cross-sectional area $S_{2FL}$ of the second bead filler 52 is less than 150% of the cross-sectional area $S_{BFL}$ of the first bead filler 51, the rigidity in the section from the bead portion 5 to the sidewall portion 4 is difficult to effectively increase with the second bead filler 52 even if the second bead filler 52 is provided. When the cross-sectional area $S_{2FL}$ of the second bead filler 52 is greater than 400% of the cross-sectional area $S_{BFL}$ of the first bead filler 51, the rigidity in the section from the bead portion 5 to the sidewall portion 4 becomes excessively high due to the second bead filler 52, and thus the ride comfort is difficult to prevent from being compromised.

On the other hand, when the cross-sectional area $S_{2FL}$ of the second bead filler 52 is in a range of from 150% or greater to 400% or less of the cross-sectional area $S_{BFL}$ of the first bead filler 51, the rigidity can be effectively increased with the second bead filler 52 while preventing the rigidity of the section from the bead portion 5 to the sidewall portion 4 from being excessively high. With this configuration, the rigidity during the run-flat travel can be ensured, while preventing the ride comfort under normal travel conditions from being compromised.

Furthermore, $(0.16 \times SH \times LI - 1100) \leq S_{ALL} \leq (0.16 \times SH \times LI - 800)$ is satisfied, where $S_{ALL}$ represents the sum of the cross-sectional areas, in the tire meridian cross-section, of the side reinforcing rubber layer 10, the first bead filler 51, and the second bead filler 52 located on one side of the tire equatorial plane CL in the tire width direction, SH represents the tire cross-sectional height, and LI represents the load index. Thus, the rigidity during the run-flat travel can be ensured, while preventing the ride comfort under normal travel conditions from being compromised. In other words, when $S_{ALL} \leq (0.16 \times SH \times LI - 1100)$ holds, the sum $S_{ALL}$ of the cross-sectional areas of the side reinforcing rubber layer 10, the first bead filler 51, and the second bead filler 52 is excessively small, meaning that the rigidity in the section from the bead portion 5 to the sidewall portion 4 is difficult to effectively increase, even if the side reinforcing rubber layer 10 and the second bead filler 52 are provided. When $S_{ALL} > (0.16 \times SH \times LI - 800)$ holds, the sum $S_{ALL}$ of the cross-sectional areas of the side reinforcing rubber layer 10, the first bead filler 51, and the second bead filler 52 is excessively large, the rigidity in the section from the bead portion 5 to the sidewall portion 4 is excessively high, meaning that the ride comfort is difficult to prevent from being compromised.

On the other hand, when $(0.16 \times SH \times LI - 1100) \leq S_{ALL} \leq (0.16 \times SH \times LI - 800)$ is satisfied, the rigidity in the section from the bead portion 5 to the sidewall portion 4 can be effectively increased with the second bead filler 52, preventing the rigidity from being excessively high. With this configuration, the rigidity during the run-flat travel can be ensured, while preventing the ride comfort under normal travel conditions from being compromised. As a result of these, both run-flat durability and ride comfort performance can be achieved in a compatible manner.

Furthermore, the first bead filler height $H_{BFL}$ is in a range of from 23% or greater to 30% or less of the tire cross-sectional height SH, whereby the rigidity of the bead portion 5 can be more reliably ensured. In other words, when the first bead filler height $H_{BFL}$ is less than 23% of the tire cross-sectional height SH, the first bead filler height $H_{BFL}$ is excessively low, and the rigidity of the first bead filler 51 might be difficult to ensure. In this case, the rigidity of the bead portion 5 might be difficult to ensure, and the rigidity during the run-flat travel might be difficult to ensure. On the other hand, when the first bead filler height $H_{BFL}$ is 23% or greater of the tire cross-sectional height SH, the rigidity of the first bead filler 51 can be more reliably ensured, and the rigidity of the bead portion 5 can be more reliably ensured.

The second bead filler height $H_{2FL}$ is in a range of from 50% or greater to 60% or less of the tire cross-sectional height SH. Thus, the rigidity in the section from the bead portion 5 to the sidewall portion 4 can be more reliably prevented from becoming excessively high. In other words, when the second bead filler height $H_{2FL}$ is greater than 60% of the tire cross-sectional height SH, the range in the sidewall portion 4 where the second bead filler 52 is disposed is excessively large, and thus the rigidity in the section from the bead portion 5 to the sidewall portion 4 might be excessively high. On the other hand, when the second bead filler height $H_{2FL}$ is 60% or less of the tire cross-sectional height SH, the range in which the second bead filler 52 is disposed can be prevented from excessively large. Thus, the rigidity in the section from the bead portion 5 to the sidewall portion 4 can be more reliably prevented from becoming excessively large.

The second bead filler height $H_{2FL}$ is in a range of from 180% or greater to 250% or less of the first bead filler height $H_{BFL}$. Thus, the rigidity during the run-flat travel can be ensured, while preventing the ride comfort under normal travel conditions from being compromised. In other words, when the second bead filler height $H_{2FL}$ is less than 180% of the first bead filler height $H_{BFL}$, the second bead filler height $H_{2FL}$ is excessively low, and thus the rigidity in the section from the bead portion 5 to the sidewall portion 4 might be difficult to effectively increase with the second bead filler 52 even if the second bead filler 52 is provided. When the second bead filler height $H_{2FL}$ is greater than 250% of the first bead filler height $H_{BFL}$, the second bead filler height $H_{2FL}$ is excessively high, and thus the rigidity in the section from the bead portion 5 to the sidewall portion 4 becomes excessively high due to the second bead filler 52, and the ride comfort might be difficult to prevent from being compromised.

On the other hand, when the second bead filler height $H_{2FL}$ is in a range of from 180% or greater to 250% or less of the first bead filler height $H_{BFL}$, the rigidity in the section from the bead portion 5 to the sidewall portion 4 can be appropriately increased with the second bead filler 52 while more reliably preventing the rigidity of the section from being excessively high. With this configuration, the rigidity during the run-flat travel can be ensured, while more reliably preventing the ride comfort under normal travel conditions from being compromised.

The cross-sectional area $S_{2FL}$ of the second bead filler 52 in the tire meridian cross-section is in a range of from 150% or greater to 200% or less of the cross-sectional area $S_{BFL}$ of the first bead filler 51 in the tire meridian cross-section. Thus, the ride comfort under normal travel conditions can be more reliably prevented from being compromised. In other words, with the cross-sectional area $S_{2FL}$ of the second bead filler 52 being 200% or less of the cross-sectional area $S_{BFL}$ of the first bead filler 51, the rigidity in the section from the bead portion 5 to the sidewall portion 4 can be more reliably prevented from becoming excessively high due to the second bead filler 52. With this configuration, the ride comfort under normal travel conditions can be more reliably prevented from being compromised. As a result of these, both run-flat durability and ride comfort performance can be more reliably achieved in a compatible manner.

The overlapping amount $L_{RFL}$ of the side reinforcing rubber layer 10 and the first bead filler 51 is in a range of from 20% or greater to 50% or less of the first bead filler height $H_{BFL}$. Thus, the rigidity during the run-flat travel can be more reliably ensured, while preventing the ride comfort under normal travel conditions from being compromised. In other words, when the overlapping amount $L_{RFL}$ is less than 20% of the first bead filler height $H_{BFL}$, the overlapping amount $L_{RFL}$ of the side reinforcing rubber layer 10 and the first bead filler 51 is excessively small, and thus the rigidity of the portion where the side reinforcing rubber layer 10 and the first bead filler 51 overlap might be difficult to increase. In this case, even if the sidewall portion 4 is provided with the side reinforcing rubber layer 10, the rigidity of the portion at or near the bead portion 5 might be difficult to effectively increase. When the overlapping amount $L_{RFL}$ is greater than 50% of the first bead filler height $H_{BFL}$, the overlapping amount $L_{RFL}$ of the side reinforcing rubber layer 10 and the first bead filler 51 is excessively large, and thus the rigidity of the portion where the side reinforcing rubber layer 10 and the first bead filler 51 overlap might be excessively high. In this case, the rigidity of the portion at or near the bead portion 5 might be excessively high.

On the other hand, when the overlapping amount $L_{RFL}$ is in a range of from 20% or greater to 50% or less of the first bead filler height $H_{BFL}$, the rigidity of the portion at or near the bead portion 5 can be appropriately increased with the side reinforcing rubber layer 10 while more reliably preventing the rigidity of the portion at or near the bead portion 5 from being excessively high. With this configuration, the rigidity during the run-flat travel can be ensured, while more reliably preventing the ride comfort under normal travel conditions from being compromised.

The overlapping amount $L_{2FL}$ of the first bead filler 51 and the second bead filler 52 is in a range of from 40% or greater to 70% or less of the first bead filler height $H_{BFL}$. Thus, the rigidity during the run-flat travel can be ensured, while preventing the ride comfort under normal travel conditions from being compromised. In other words, when the overlapping amount $L_{2FL}$ is less than 20% of the first bead filler height $H_{BFL}$, the overlapping amount $L_{2FL}$ of the first bead filler 51 and the second bead filler 52 is excessively small, and thus the rigidity of the portion where the first bead filler 51 and the second bead filler 52 overlap might be difficult to increase. In this case, even if the sidewall portion 4 is provided with the second bead filler 52, the rigidity of the portion at or near the bead portion 5 might be difficult to effectively increase. When the overlapping amount $L_{2FL}$ is greater than 70% of the first bead filler height $H_{BFL}$, the overlapping amount $L_{2FL}$ of the first bead filler 51 and the second bead filler 52 is excessively large, and thus the rigidity of the portion where the first bead filler 51 and the second bead filler 52 overlap might be excessively high. In this case, the rigidity of the portion at or near the bead portion 5 might be excessively high.

On the other hand, when the overlapping amount $L_{2FL}$ is in a range of from 40% or greater to 70% or less of the first bead filler height $H_{BFL}$, the rigidity of the portion at or near the bead portion 5 can be appropriately increased with the second bead filler 52 while more reliably preventing the rigidity of the portion at or near the bead portions 5 from being excessively high. With this configuration, the rigidity during the run-flat travel can be ensured, while more reliably preventing the ride comfort under normal travel conditions from being compromised. As a result of these, both run-flat durability and ride comfort performance can be more reliably achieved in a compatible manner.

The overlapping amount $L_{RFL}$ of the side reinforcing rubber layer 10 and the first bead filler 51 is in a range of from 8 mm or greater to 16 mm or less. Thus, the rigidity during the run-flat travel can be more reliably ensured, while preventing the ride comfort under normal travel conditions from being compromised. In other words, when the overlapping amount $L_{RFL}$ is less than 8 mm, the overlapping amount $L_{RFL}$ of the side reinforcing rubber layer 10 and the first bead filler 51 is excessively small, and thus the rigidity of the portion at or near the bead portion 5 might be difficult to effectively increase even if the sidewall portion 4 is provided with the side reinforcing rubber layer 10. When the overlapping amount $L_{RFL}$ is greater than 16 mm, the overlapping amount $L_{RFL}$ of the side reinforcing rubber layer 10 and the first bead filler 51 is excessively large, and thus the rigidity of the portion at or near the bead portion 5 might be excessively high.

On the other hand, when the overlapping amount $L_{RFL}$ is in a range of from 8 mm or greater to 16 mm or less, the rigidity of the portion at or near the bead portion 5 can be appropriately increased with the side reinforcing rubber layer 10 while more reliably preventing the rigidity of the portion at or near the bead portion 5 from being excessively high. With this configuration, the rigidity during the run-flat travel can be ensured, while preventing the ride comfort under normal travel conditions from being compromised.

The overlapping amount $L_{2FL}$ of the first bead filler 51 and the second bead filler 52 is in a range of from 10 mm or greater to 20 mm or less. Thus, the rigidity during the run-flat travel can be ensured, while more reliably preventing the ride comfort under normal travel conditions from being compromised. In other words, when the overlapping amount $L_{2FL}$ is less than 10 mm, the overlapping amount $L_{2FL}$ of the first bead filler 51 and the second bead filler 52 is excessively small, and thus the rigidity of the portion at or near the bead portion 5 might be difficult to effectively increase even if the sidewall portion 4 is provided with the second bead filler 52. When the overlapping amount $L_{2FL}$ is greater than 20 mm, the overlapping amount $L_{2FL}$ of the first bead filler 51 and the second bead filler 52 is excessively large, and thus the rigidity of the portion at or near the bead portion 5 might be excessively high.

On the other hand, when the overlapping amount $L_{2FL}$ is in a range of from 10 mm or greater to 20 mm or less, the rigidity of the portion at or near the bead portion 5 can be appropriately increased with the second bead filler 52 while more reliably preventing the rigidity of the portion at or near the bead portion 5 from being excessively high. With this configuration, the rigidity during the run-flat travel can be ensured, while preventing the ride comfort under normal travel conditions from being compromised. As a result of these, both run-flat durability and ride comfort performance can be more reliably achieved in a compatible manner.

The relationship $M_{BFL} > M_{RFL} > M_{2FL}$ is satisfied where $M_{RFL}$ represents the modulus of the side reinforcing rubber layer 10 at 100% elongation, $M_{BFL}$ represents the modulus of the first bead filler 51 at 100% elongation, and $M_{2FL}$ represents the modulus of the second bead filler 52 at 100% elongation. With this configuration, the rigidity during the run-flat travel can be ensured, while more reliably preventing the ride comfort under normal travel conditions from being compromised. In other words, the modulus $M_{BFL}$ of the first bead filler 51 at 100% elongation is greater than the modulus $M_{RFL}$ of the side reinforcing rubber layer 10 at 100% elongation, and thus the rigidity of the portion at or near the bead portion 5 can be more reliably increased with the first bead filler 51. Further, the modulus $M_{2FL}$ of the second bead filler 52 at 100% elongation is less than the modulus $M_{RFL}$ of the side reinforcing rubber layer 10 at 100% elongation, and thus, even if the second bead filler 52 is provided, the rigidity of the portion at or near the bead portion 5 can be prevented from becoming excessively high, and the ease of deflection in the section from the bead portion 5 to the sidewall portion 4 can be ensured. With these configurations, the rigidity during the run-flat travel can be ensured, while more reliably preventing the ride comfort under the normal travel conditions from being compromised. As a result, both run-flat durability and ride comfort performance can be more reliably achieved in a compatible manner.

The relationship of $(2.0 \times M_{2FL}) > M_{BFL} > M_{RFL} > (1.5 \times M_{2FL})$ is satisfied, where $M_{RFL}$ represents the modulus of the side reinforcing rubber layer 10 at 100% elongation, $M_{BFL}$ represents the modulus of the first bead filler 51 at 100% elongation, and $M_{2FL}$ represents the modulus of the second bead filler 52 at 100% elongation. With this configuration, the rigidity during the run-flat travel can be ensured, while more reliably preventing the ride comfort under normal travel conditions from being compromised. In other words, the modulus $M_{BFL}$ of the first bead filler 51 at 100% elongation is less than double the magnitude of the modulus $M_{2FL}$ of the second bead filler 52 at 100% elongation, and thus the rigidity of the portion at or near the bead portion 5 can be prevented from becoming excessively high, and the ease of deflection in the section from the bead portion 5 to the sidewall portion 4 can be ensured. The modulus $M_{RFL}$ of the side reinforcing rubber layer 10 at 100% elongation is less than 1.5 times the magnitude of the modulus $M_{2FL}$ of the second bead filler 52 at 100% elongation, and thus the rigidity of the sidewall portion 4 can be more reliably ensured with the side reinforcing rubber layer 10. With these configurations, the rigidity during the run-flat travel can be ensured, while more reliably preventing the ride comfort under the normal travel conditions from being compromised. As a result, both run-flat durability and ride comfort performance can be more reliably achieved in a compatible manner.

With the run-flat tire 1 according to the present embodiment, the tire cross-sectional height SH is 100 mm or greater, and therefore the sidewall portion 4 tends to deflect. To increase run-flat durability, the rigidity of the sidewall portion 4 in the tire radial direction needs to be increased. However, when the rigidity of the sidewall portion 4 is increased, deterioration of ride comfort under normal travel conditions may be difficult to suppress. Thus, in the run-flat tire 1 according to the present embodiment, the second bead filler 52 overlapping the first bead filler 51 is disposed, the first bead filler height $H_{BFL}$ and the second bead filler height $H_{2FL}$ are within a predetermined range, and the side reinforcing rubber layer 10, the first bead filler 51, and the cross-sectional areas $S_{2FL}$ of the second bead filler 52 are within a predetermined range. With this configuration, the rigidity during the run-flat travel can be ensured, while preventing the ride comfort under normal travel conditions from being compromised, even when the tire cross-sectional height SH is 100 mm or greater. As a result, both run-flat durability and ride comfort performance can be more reliably achieved in a compatible manner.

The first bead filler height $H_{BFL}$ of the first bead filler 51 is in a range of from 24 mm or greater to 33 mm or less, and thus, the rigidity during the run-flat travel can be ensured, while more reliably preventing the ride comfort under normal travel conditions from being compromised. In other words, when the first bead filler height $H_{BFL}$ is less than 24 mm, the first bead filler height $H_{BFL}$ is excessively low, and the rigidity of the first bead filler 51 might be difficult to ensure. In this case, the rigidity of the portion at or near the bead portion 5 might be difficult to ensure, and the rigidity during the run-flat travel might be difficult to ensure. Further, when the first bead filler height $H_{BFL}$ is greater than 33 mm, the first bead filler height $H_{BFL}$ is excessively high, and the rigidity of the first bead filler 51 might be excessively high. In this case, the rigidity of the portion at or near the bead portion 5 might be excessively high, and the ride comfort might be difficult to prevent from being compromised.

On the other hand, when the first bead filler height $H_{BFL}$ is in a range of from 24 mm or greater to 33 mm or less, an appropriate rigidity of the portion at or near the bead portion 5 can be ensured, while more reliably preventing the rigidity of the portion at or near the bead portion 5 from being excessively high. With this configuration, the rigidity during the run-flat travel can be ensured, while more reliably preventing the ride comfort under normal travel conditions from being compromised. As a result, both run-flat durability and ride comfort performance can be more reliably achieved in a compatible manner.

The second bead filler height $H_{2FL}$ of the second bead filler 52 is in a range of from 54 mm or greater to 78 mm or less, and thus, the rigidity during the run-flat travel can be ensured, while more reliably preventing the ride comfort under normal travel conditions from being compromised. In other words, when the second bead filler height $H_{2FL}$ is less than 54 mm, the second bead filler height $H_{2FL}$ is excessively low, and thus the rigidity in the section from the bead portion 5 to the sidewall portion 4 might be difficult to effectively increase with the second bead filler 52 even if the second bead filler 52 is provided. When the second bead filler height $H_{2FL}$ is greater than 78 mm, the second bead filler height $H_{2FL}$ is excessively high, and thus the rigidity in the section from the bead portion 5 to the sidewall portion 4 is excessively high, and the ride comfort might be difficult to prevent from being compromised.

On the other hand, when the second bead filler height $H_{2FL}$ is in a range of from 54 mm or greater to 78 mm or less, an appropriate rigidity in the section from the bead portion 5 to the sidewall portion 4 can be ensured with the second bead filler 52, while more reliably preventing the rigidity of the section from the bead portion 5 to the sidewall portion 4 from being excessively high. With this configuration, the rigidity during the run-flat travel can be ensured, while more reliably preventing the ride comfort under normal travel conditions from being compromised. As a result, both run-flat durability and ride comfort performance can be more reliably achieved in a compatible manner.

Regarding the first bead filler 51 and the second bead filler 52, the difference between the first bead filler height $H_{BFL}$ and the second bead filler height $H_{2FL}$ is 30% or greater of the tire cross-sectional height SH. Thus, the rigidity during the run-flat travel can be ensured, while preventing the ride comfort under normal travel conditions from being compromised. In other words, when the difference between the first bead filler height $H_{BFL}$ and the second bead filler height $H_{2FL}$ is less than 30% of the tire cross-sectional height SH, the second bead filler height $H_{2FL}$ is excessively low, and thus the rigidity in the section from the bead portion 5 to the sidewall portion 4 might be difficult to effectively increase with the second bead filler 52 even if the second bead filler 52 is provided.

On the other hand, when the difference between the first bead filler height $H_{BFL}$ and the second bead filler height $H_{2FL}$ is 30% or greater of the tire cross-sectional height SH, an appropriate rigidity in the section from the bead portion 5 to the sidewall portion 4 can be ensured with the second bead filler 52, while more reliably preventing the rigidity of the section from the bead portion 5 to the sidewall portion 4 from being excessively high. With this configuration, the rigidity during the run-flat travel can be ensured, while more reliably preventing the ride comfort under normal travel conditions from being compromised. As a result, both run-flat durability and ride comfort performance can be more reliably achieved in a compatible manner.

Modified Examples

Note that in the run-flat tire 1 according to the above-described embodiment, the first bead filler height $H_{BFL}$ of the first bead filler 51 is in a range of from 23% or greater to 30% or less of the tire cross-sectional height SH, and is in a range of from 24 mm or greater to 33 mm or less, but both requirements are not necessarily satisfied. The first bead filler height $H_{BFL}$ of the first bead filler 51 may satisfy at least one of the requirements of being in a range of from 23% or greater to 30% or less of the tire cross-sectional height SH, or being in a range of from 24 mm or greater to 33 mm or less. Similarly, the second bead filler height $H_{2FL}$ of the second bead filler 52 is in a range of from 50% or greater to 60% or less of the tire cross-sectional height SH, and is in a range of from 54 mm or greater to 78 mm or less, but both requirements are not necessarily satisfied. The second bead filler height $H_{2FL}$ of the second bead filler 52 may satisfy at least one of the requirements of being in a range of from 50% or greater to 60% or less of the tire cross-sectional height SH, or being in a range of from 54 mm or greater to 78 mm or less.

In the run-flat tire 1 according to the above-described embodiment, the overlapping amount $L_{RFL}$ of the side reinforcing rubber layer 10 and the first bead filler 51 is in a range of from 20% or greater to 50% or less of the first bead filler height $H_{BFL}$, and is in a range of from 8 mm or greater to 16 mm or less, but both requirements are not necessarily satisfied. The overlapping amount $L_{RFL}$ of the side reinforcing rubber layer 10 and the first bead filler 51 may satisfy at least one of the requirements of being in a range of from 20% or greater to 50% or less of the first bead filler height $H_{BFL}$, or being in a range of from 8 mm or greater to 16 mm or less. Similarly, in the run-flat tire 1 according to the above-described embodiment, the overlapping amount $L_{2FL}$ of the first bead filler 51 and the second bead filler 52 is in a range of from 40% or greater to 70% or less of the first bead filler height $H_{BFL}$, and is in a range of from 10 mm or greater to 20 mm or less, but both requirements are not necessarily satisfied. The overlapping amount $L_{2FL}$ of the first bead filler 51 and the second bead filler 52 may satisfy at least one of the requirements of being in a range of from 40% or greater to 70% or less of the first bead filler height $H_{BFL}$, or being in a range of from 10 mm or greater to 20 mm or less.

In the run-flat tire 1 according to the above-described embodiment, the belt layer 7 is configured by layering two layers of the first belt ply 71 and the second belt ply 72, but the belt layer 7 may be composed of three or more layers of belt plies. Even when the belt layer 7 is composed of three or more layers of belt plies, it suffices if the belt layer 7 is disposed with respect to the side reinforcing rubber layer 10 in such a positional relationship that a predetermined range of the side reinforcing rubber layer 10 at or near the outer side end portion 10a is disposed to overlap the belt layer 7 in the tire radial direction.

In the run-flat tire 1 according to the above-described embodiment, the carcass 6 is formed by one layer, but the carcass 6 may be formed by layering a plurality of layers. It suffices if the carcass 6 includes the carcass body portion 6a and the turned-up portion 6b and is disposed so as to separate the side reinforcing rubber layer 10 from the first bead filler 51 and separate the first bead filler 51 from the second bead filler 52, regardless of the number of carcasses 6.

Examples

FIGS. 3A to 3H are tables showing results of performance evaluation tests of run-flat tires. Hereinafter, performance evaluation tests performed on the run-flat tire of Conventional Example, the run-flat tire 1 according to an embodiment of the present technology, and the run-flat tire of Comparative Example compared to the run-flat tire 1 according to an embodiment of the present technology will be described below. The performance evaluation tests are performed on ride comfort hardness under normal travel conditions and run-flat durability indicating durability during the run-flat travel of the run-flat tire 1.

The performance evaluation tests are performed using test tires each having a tire nominal size of 245/50RF19 101 W defined by JATMA and mounted on a rim wheel having a rim size of 19×7.5 J and conforming with JATMA standards. Among the performance evaluation tests, the ride comfort hardness evaluation test is performed by fitting a test tire mounted on a rim wheel on a test vehicle, which is a passenger vehicle having an engine displacement of 3500 cc and of rear-wheel drive, and adjusting the air pressure to 230 kPa. The ride comfort hardness evaluation method is performed through sensory evaluation by a test driver when traveling on a test vehicle equipped with test tires on a predetermined road surface in a test course at a predetermined speed. The results are displayed with an index of 100 representing the score for the Conventional Example described below. In the ride comfort hardness, larger values indicate superior ride comfort performance.

In addition, the run-flat durability evaluation method is performed in accordance with ECE (Economic Commission for Europe) R30. The travel distance is measured by weighing 65% of the maximum load capacity on a drum testing machine at an air pressure of 0 kPa, and causing travel at 80 km/h until the travel is no longer possible. The results are displayed with an index of 100 representing the score for the Conventional Example described below. In the run-flat durability, larger values indicate a longer travel distance when traveling at 0 kPa until the travel is no longer possible due to a tire failure, meaning that larger values indicate superior durability during the run-flat travel.

The performance evaluation tests are performed on 44 types of run-flat tires including: a run-flat tire of the Conventional Example, which is an example of a known run-flat tire, run-flat tires of Examples 1 to 37, which are the run-flat tires 1 according to an embodiment of the present technology, and run-flat tires of Comparative Examples 1 to 6, which are run-flat tires compared to the run-flat tire 1 according to an embodiment of the present technology. The run-flat tire of the Conventional Example and the run-flat tires of Comparative Examples 1 to 6 are any one of the following: The first bead filler height $H_{BFL}$ is not 30% or less of the tire cross-sectional height SH. The second bead filler height $H_{2FL}$ is not 50% or greater of the tire cross-sectional height SH. The cross-sectional area $S_{2FL}$ of the second bead filler 52 in the tire meridian cross-section is not in a range of from 150% or greater to 400% or less of the cross-sectional area $S_{BFL}$ of the first bead filler 51. The relationship $(0.16 \times SH \times LI - 1100) \leq S_{ALL} \leq (0.16 \times SH \times LI - 800)$ is not satisfied where $S_{ALL}$ represents the sum of the cross-sectional area $S_{RFL}$ of the side reinforcing rubber layer 10, the cross-sectional area $S_{BFL}$ of the first bead filler 51, and the cross-sectional area $S_{2FL}$ of the second bead filler 52 in the tire meridian cross-section, SH represents the tire cross-sectional height, and LI represents the load index.

In contrast, Examples 1 to 37, which are each an example of the run-flat tire 1 according to an embodiment of the present technology, satisfy the following: The first bead filler height $H_{BFL}$ is 30% or less of the tire cross-sectional height SH. The second bead filler height $H_{2FL}$ is 50% or greater of the tire cross-sectional height SH. The cross-sectional area $S_{2FL}$ of the second bead filler 52 in the tire meridian cross-section is in a range of from 150% or greater to 400% or less of the cross-sectional area $S_{BFL}$ of the first bead filler 51. The relationship $(0.16 \times SH \times LI - 1100) \leq S_{ALL} \leq (0.16 \times SH \times LI - 800)$ is satisfied where $S_{ALL}$ represents the sum of the cross-sectional area $S_{RFL}$ of the side reinforcing rubber layer 10, the cross-sectional area $S_{BFL}$ of the first bead filler 51, and the cross-sectional area $S_{2FL}$ of the second bead filler 52 in the tire meridian cross-section, SH represents the tire cross-sectional height, and LI represents the load index. Furthermore, the run-flat tires 1 according to Examples 1 to 37 differ from each other in the following points: the second bead filler height $H_{2FL}$ relative to the first bead filler height $H_{BFL}$ ($H_{2FL}/H_{BFL}$); the overlapping amount $L_{RFL}$ of the side reinforcing rubber layer 10 and the first bead filler 51; the overlapping amount $L_{RFL}$ of the side reinforcing rubber layer 10 and the first bead filler 51 relative to the first bead filler height $H_{BFL}$ ($L_{RFL}/H_{BFL}$); the overlapping amount $L_{2FL}$ of the first bead filler 51 and the second bead filler 52; the overlapping amount $L_{2FL}$ of the first bead filler 51 and the second bead filler 52 relative to the first bead filler height $H_{BFL}$ ($L_{2FL}/H_{BFL}$); whether the relationship (2.0× $M_{2FL}$)>$M_{BFL}$ is satisfied; whether the relationship $M_{BFL}$>$M_{RFL}$ is satisfied; and whether the relationship $M_{RFL}$ (1.5×$M_{2FL}$) is satisfied, where $M_{2FL}$ represents the modulus of the second bead filler 52 at 100% elongation, $M_{BFL}$ represents the modulus of the first bead filler 51 at 100% elongation, and $M_{RFL}$ represents the modulus of the side reinforcing rubber layer 10 at 100% elongation.

Note that the run-flat tire of the Conventional Example, the run-flat tires of Comparative Examples 1 to 6, and the run-flat tires 1 according to Examples 1 to 37 under the performance evaluation tests all have a tire cross-sectional height SH of 122 mm and a load index LI of 101. Therefore, (0.16×SH×LI−1100), which is compared with the sum $S_{ALL}$ of the cross-sectional areas of the side reinforcing rubber layer 10, the first bead filler 51, and the second bead filler 52, is about 872, and (0.16×SH×LI−800) is about 1172. Therefore, whether (0.16×SH×LI−1100)≤$S_{ALL}$≤(0.16×SH×LI−800) is satisfied indicates whether 872≤$S_{ALL}$≤1172 is satisfied in the present performance evaluation test.

As a result of the performance evaluation tests using these run-flat tires 1, as illustrated in FIGS. 3A to 3H, it is found that the run-flat tires 1 according to Examples 1 to 37 can improve at least one of the ride comfort hardness and the run-flat durability without compromising the ride comfort hardness and the run-flat durability as compared to the Conventional Example. In other words, the run-flat tires 1 according to Examples 1 to 37 allow run-flat durability and ride comfort performance to be achieved in a compatible manner.

The invention claimed is:

1. A run-flat tire, comprising:
   sidewall portions disposed on both sides in a tire width direction;
   bead portions disposed respectively on an inner side of each of the sidewall portions in a tire radial direction;
   a bead core disposed in each of the bead portions;
   a carcass spanning between the bead portions on both sides in the tire width direction, extending to an inner side of the bead core in each of the bead portions in the tire radial direction, and being folded back in the tire width direction;
   a side reinforcing rubber layer disposed on a tire inner surface side of the carcass in the sidewall portion;
   a first bead filler disposed on an inner side of a turned-up portion of the carcass in the tire width direction and on an outer side of the bead core in the tire radial direction, the turn up portion being a portion folded back to an outer side of the bead core in the tire width direction; and
   a second bead filler disposed on an outer side of the turned-up portion in the tire width direction,
   the first bead filler being arranged to overlap the side reinforcing rubber layer with the carcass provided in-between, the first bead filler having a first bead filler height being a height in the tire radial direction, from a reference position on an inner side of a tire cross-sectional height in the tire radial direction to an outer side end portion of the first bead filler in the tire radial direction, the first bead filler height being 30% or less of the tire cross-sectional height,
   the second bead filler being arranged to overlap the first bead filler with the carcass provided in-between, the second bead filler having a second bead filler height being a height in the tire radial direction, from the reference position to an outer side end portion of the second bead filler in the tire radial direction, the second bead filler height being 50% or greater of the tire cross-sectional height,
   in the first bead filler and the second bead filler, a cross-sectional area of the second bead filler in a tire meridian cross-section being in a range of from 150% or greater to 400% or less of a cross-sectional area of the first bead filler in the tire meridian cross-section, and
   the side reinforcing rubber layer, the first bead filler, and the second bead filler satisfying a relationship (0.16× SH×LI−1100)≤SALL≤(0.16×SH×LI−800), SALL representing a sum of cross-sectional areas, in the tire meridian cross-section, of the side reinforcing rubber layer, the first bead filler, and the second bead filler located on one side of a tire equatorial plane in the tire width direction, SH representing the tire cross-sectional height, LI representing a load index.

2. The run-flat tire according to claim 1, wherein
   an overlapping amount of the side reinforcing rubber layer and the first bead filler overlapping with the carcass provided in-between is in a range of from 20% or greater to 50% or less of the first bead filler height, and
   an overlapping amount of the first bead filler and the second bead filler overlapping with the carcass provided in-between is in a range of from 40% or greater to 70% or less of the first bead filler height.

3. The run-flat tire according to claim 1, wherein
   an overlapping amount of the side reinforcing rubber layer and the first bead filler overlapping with the carcass provided in-between is in a range of 8 mm or greater to 16 mm or less, and
   an overlapping amount of the first bead filler and the second bead filler overlapping with the carcass provided in-between is in a range of 10 mm or greater to 20 mm or less.

4. The run-flat tire according to claim 1, wherein the side reinforcing rubber layer, the first bead filler, and the second bead filler satisfy a relationship MBFL>MRFL>M2FL, where MRFL represents a modulus of the side reinforcing rubber layer at 100% elongation, MBFL represents a modulus of the first bead filler at 100% elongation, and M2FL represents a modulus of the second bead filler at 100% elongation.

5. The run-flat tire according to claim 1, wherein the side reinforcing rubber layer, the first bead filler, and the second bead filler satisfy a relationship (2.0× M2FL)>MBFL>MRFL>(1.5×M2FL), where MRFL represents a modulus of the side reinforcing rubber layer at 100% elongation, MBFL represents a modulus of the first bead filler at 100% elongation, and M2FL represents a modulus of the second bead filler at 100% elongation.

6. The run-flat tire according to claim 1, wherein the tire cross-sectional height is 100 mm or greater.

7. The run-flat tire according to claim 1, wherein the first bead filler height is in a range of from 24 mm or greater to 33 mm or less.

8. The run-flat tire according to claim 1, wherein the second bead filler height is in a range of from 54 mm or greater to 78 mm or less.

9. The run-flat tire according to claim 1, wherein in the first bead filler and the second bead filler, a difference between the first bead filler height and the second bead filler height is 30% or greater of the tire cross-sectional height.

10. The run-flat tire according to claim 1, wherein
the first bead filler height is in a range of from 23% or greater to 30% or less of the tire cross-sectional height,
the second bead filler height is in a range of from 50% or greater to 60% or less of the tire cross-sectional height and in a range of from 180% or greater to 250% or less of the first bead filler height, and
the cross-sectional area of the second bead filler in the tire meridian cross-section is in a range of from 150% or greater to 200% or less of the cross-sectional area of the first bead filler in the tire meridian cross-section.

11. The run-flat tire according to claim 10, wherein
an overlapping amount of the side reinforcing rubber layer and the first bead filler overlapping with the carcass provided in-between is in a range of from 20% or greater to 50% or less of the first bead filler height, and
an overlapping amount of the first bead filler and the second bead filler overlapping with the carcass provided in-between is in a range of from 40% or greater to 70% or less of the first bead filler height.

12. The run-flat tire according to claim 11, wherein
an overlapping amount of the side reinforcing rubber layer and the first bead filler overlapping with the carcass provided in-between is in a range of 8 mm or greater to 16 mm or less, and
an overlapping amount of the first bead filler and the second bead filler overlapping with the carcass provided in-between is in a range of 10 mm or greater to 20 mm or less.

13. The run-flat tire according to claim 12, wherein the side reinforcing rubber layer, the first bead filler, and the second bead filler satisfy a relationship MBFL>MRFL>M2FL, where MRFL represents a modulus of the side reinforcing rubber layer at 100% elongation, MBFL represents a modulus of the first bead filler at 100% elongation, and M2FL represents a modulus of the second bead filler at 100% elongation.

14. The run-flat tire according to claim 13, wherein the side reinforcing rubber layer, the first bead filler, and the second bead filler satisfy a relationship (2.0×M2FL)>MBFL>MRFL>(1.5×M2FL), where MRFL represents a modulus of the side reinforcing rubber layer at 100% elongation, MBFL represents a modulus of the first bead filler at 100% elongation, and M2FL represents a modulus of the second bead filler at 100% elongation.

15. The run-flat tire according to claim 14, wherein the tire cross-sectional height is 100 mm or greater.

16. The run-flat tire according to claim 15, wherein the first bead filler height is in a range of from 24 mm or greater to 33 mm or less.

17. The run-flat tire according to claim 16, wherein the second bead filler height is in a range of from 54 mm or greater to 78 mm or less.

18. The run-flat tire according to claim 17, wherein in the first bead filler and the second bead filler, a difference between the first bead filler height and the second bead filler height is 30% or greater of the tire cross-sectional height.

\* \* \* \* \*